(12) United States Patent
Giambrone et al.

(10) Patent No.: US 11,346,259 B2
(45) Date of Patent: May 31, 2022

(54) CONTROL APPARATUS FOR CAMSHAFT PHASER

(71) Applicant: DELPHI AUTOMOTIVE SYSTEMS LUXEMBOURG SA, Bascharage (LU)

(72) Inventors: Lucas Giambrone, Haucourt-Moulaine (FR); Sebastien Stoltz-Douchet, Basse-Ham (FR); Rodrigue Berhin, Arlon (BE)

(73) Assignee: Delphi Automotive Systems Luxembourg SA, Luxembourg (LU)

( * ) Notice: Subject to any disclaimer, the term of this patent is extended or adjusted under 35 U.S.C. 154(b) by 0 days.

(21) Appl. No.: 17/254,676

(22) PCT Filed: Jun. 27, 2019

(86) PCT No.: PCT/EP2019/067182
§ 371 (c)(1),
(2) Date: Dec. 21, 2020

(87) PCT Pub. No.: WO2020/007709
PCT Pub. Date: Jan. 9, 2020

(65) Prior Publication Data
US 2021/0148255 A1 May 20, 2021

(30) Foreign Application Priority Data
Jul. 4, 2018 (FR) ...................................... 1856149

(51) Int. Cl.
*F01L 1/344* (2006.01)
*F01L 1/047* (2006.01)
(Continued)

(52) U.S. Cl.
CPC ............. *F01L 1/3442* (2013.01); *F01L 1/047* (2013.01); *F16K 15/16* (2013.01);
(Continued)

(58) Field of Classification Search
CPC ........... F01L 1/3442; F01L 2001/34426; F01L 2303/00; F01L 2001/34433;
(Continued)

(56) References Cited

U.S. PATENT DOCUMENTS 6,899,126 B2 * 5/2005 Weigand ............... F01L 1/3442
137/512.15
8,127,790 B2 * 3/2012 Van Weelden ...... F15B 13/0402
137/550

(Continued)

FOREIGN PATENT DOCUMENTS

DE 102006012775 A1 9/2007

*Primary Examiner* — Patrick Hamo
*Assistant Examiner* — Wesley G Harris
(74) *Attorney, Agent, or Firm* — Joshua M. Haines (57) ABSTRACT

A device for controlling a camshaft phaser includes a hydraulic element with a body, a slide assembly having a slide body, and a valve assembly with a first valve, a second valve, and a third valve. The device also includes an actuator which moves along a longitudinal axis between 1) a first position in which the first valve opens or closes a first fluid communication, 2) a second position in which the second valve and the tray open or close a second fluid communication, and 3) a third position in which the third valve and the slide body open or close a third fluid communication between a retard port and a retard chamber.

3 Claims, 5 Drawing Sheets

(51) Int. Cl.
*F16K 15/16* (2006.01)
*F16K 31/06* (2006.01)
*F01L 13/00* (2006.01)

(52) U.S. Cl.
CPC ... *F16K 31/0613* (2013.01); *F01L 2001/3443* (2013.01); *F01L 2001/34426* (2013.01); *F01L 2001/34463* (2013.01); *F01L 2013/101* (2013.01); *F01L 2820/031* (2013.01)

(58) Field of Classification Search
CPC ... F01L 2001/3443; F01L 1/344; F16K 11/00; F16K 11/065; F16K 11/0716; F16K 11/0708; F16K 15/16; F16K 31/0613; F16K 11/07; F16K 11/074; F16K 31/0603; H01F 7/16
USPC ............. 137/512.15, 625.68, 855; 123/188.4
See application file for complete search history.

(56) References Cited

U.S. PATENT DOCUMENTS

| | | | |
|---|---|---|---|
| 10,662,828 B1* | 5/2020 | Fischer | F01L 1/3442 |
| 10,865,666 B2* | 12/2020 | Bruce | F01L 1/34409 |
| 2003/0070713 A1 | 4/2003 | Cornea et al. | |
| 2015/0218976 A1 | 8/2015 | Last et al. | |
| 2016/0024978 A1 | 1/2016 | Lichti | |
| 2016/0123195 A1* | 5/2016 | Lichti | F04C 2/3448 |
| | | | 123/90.12 |
| 2017/0012832 A1 | 1/2017 | Hladik, Jr. | |
| 2017/0130618 A1* | 5/2017 | Haltiner, Jr. | F01L 1/3442 |
| 2018/0016950 A1 | 1/2018 | Haltiner, Jr. | |
| 2018/0355766 A1* | 12/2018 | Leblay | F01L 1/3442 |

\* cited by examiner

CONTROL APPARATUS FOR CAMSHAFT PHASER

CROSS REFERENCE TO RELATED APPLICATIONS

This application is a national stage application under 35 USC 371 of PCT Application No. PCT/EP2019/067182 having an international filing date of Jun. 27, 2019, which is designated in the United States and which claimed the benefit of FR Patent Application No. 1856149 filed on Jul. 4, 2018, the entire disclosures of each are hereby incorporated by reference in their entirety.

TECHNICAL FIELD

The present invention relates to a control device for controlling the position of a variable camshaft phaser of an internal combustion engine.

BACKGROUND OF THE INVENTION

Camshaft phasers are used to control the angular relationship between the crankshaft pulley and the camshaft of an internal combustion engine. In a double overhead camshaft engine, a camshaft phaser is used to offset the intake camshaft so as to expand the engine torque curve, increase power at variable high rpm and improve the idle quality. In addition, the exhaust cam can be offset by a camshaft phaser to allow control of exhaust gas recirculation (EGR) such as an internal EGR valve, which considerably reduces polluting emissions and also saves on fuel.

By rotating the camshafts to advance or retard positions the angular timing of the valve lift is changed. The camshaft phasers are controlled by hydraulic systems that use lubricating oil pressurized by the oil pump.

In order to allow the rotation of the camshaft, the camshaft phaser consists of a stator portion connected to the crankshaft by means of a chain or a belt, and a rotor portion secured to the camshaft.

One or more pairs of hydraulic chambers are arranged between the rotor and the stator constituting a rotary actuator. Each pair of hydraulic chambers consists of an advance chamber and a retard chamber.

Two different technologies allow the rotational movement of the rotor relative to the stator.

The first technology consists in using the pressure difference between the pressurized oil coming from the oil pump and the engine drainage pressure close to atmospheric pressure. Thus, when the pressure in the advance chamber is greater than the pressure in the retard chamber, the rotor rotates in the advance direction and likewise, when the pressure in the retard chamber is greater than the pressure in the advance chamber, the rotor turns in the retard direction. The direction of rotation is controlled by a four-port, three-position solenoid valve. The volume of oil used for the movement of the rotor is taken from the high pressure circuit and evacuated via a drain, something which consumes hydraulic power The second technology consists in using the torque oscillations exerted on the camshaft, which come from the compressive forces of the valve springs. These oscillations are transferred to the rotor, which creates a pressure difference on each pair of advance and retard chambers. Each pair of chambers is hydraulically connected by a channel including a valve allowing oil to flow in one direction. The rotor rotates in one direction. The advance or retard direction of rotation is selected by a five-port, three-position solenoid valve. A valve is integrated in a slide assembly of the solenoid valve. Depending on the position of the slide assembly, rotation is in the advance direction or the retard direction. The volume of oil displaced during the movement of the rotor is transferred between the advance chamber and the retard chamber. Oil is recirculated inside the phaser and therefore no hydraulic power is consumed. A supply of oil is required via the pressurized oil circuit from the oil pump. In order to avoid venting the internal pressure of the camshaft phaser to the oil circuit of the engine and disrupting the latter, a second valve is used at the inlet of the control solenoid valve. The valves currently used are of the ball or spring type and must have a permeability/size ratio that is compatible with the expected performance of the camshaft phaser, something which is difficult to achieve.

Manufacturers are seeking increasingly compact solutions for camshaft phasers. Solutions such as the control device also known as the central oil supply in the phaser (referred to as "barrel check valve") cannot be used because the space available for the camshaft phaser in the engine is insufficient. To this end, a compromise must be sought between a more compact camshaft phaser and its speed of rotation.

In this context, the invention aims to solve at least one of the problems associated with known valves.

SUMMARY OF THE INVENTION

The present invention solves the abovementioned problems by providing a control device for controlling a camshaft phaser, for locking or releasing a rotor of a camshaft phaser of an internal combustion engine. Furthermore, the control device comprises a hydraulic element comprising a body, a slide assembly having a slide body, a seal and a valve assembly comprising a first valve, a second valve and a third valve. The control device further comprises an electromagnetic actuator connected to the slide assembly of the hydraulic element which can move along a longitudinal axis between:

a first position, in which the first valve opens or closes a first fluid communication between an advance port of the slide body and an advance chamber of the camshaft phaser and, a second position in which the second valve and the slide body open or close a second fluid communication between an oil circuit coming from the engine and a supply port of the slide body and, a third position in which the third valve and the slide body open or close a third fluid communication between a retard port of the slide body and a retard chamber of the camshaft phaser. Moreover, in a first embodiment of the invention, the valve assembly comprises at least three valves integrated in a flexible one-piece part. Furthermore, each valve comprises at least one vane connected to two flexible arms and in that the valve is connected to two contiguous rigid rings. In a second embodiment of the invention, the valve assembly comprises a longitudinal bar and at least three valves integrated in a flexible one-piece part. Moreover, the valve comprises at least one vane connected to a flexible arm extending along the longitudinal axis and the longitudinal bar connects the valve to the contiguous valve. In addition, the longitudinal bar connects two contiguous valves. A method for producing the control device according to the two embodiments of the invention described above comprises the following steps:

inserting the valve assembly into the slide body inserting the slide insert into the assembly obtained in the previous step, inserting the corrugated stop ring into the assembly obtained in the previous step, inserting the compression spring into the body, inserting the slide assembly into the body, crimping the hydraulic element with the electromagnetic actuator.

BRIEF DESCRIPTION OF THE DRAWINGS

One or more embodiments of the invention will now be described, purely by way of example, with reference to the accompanying drawings, in which.

DESCRIPTION OF THE PREFERRED EMBODIMENTS

To facilitate and clarify the following description, the orientation from top to bottom is arbitrarily chosen and, words and expressions such as "above, below, top, bottom, high, low, etc." may be used without any intention to limit the invention.

Figure 1:
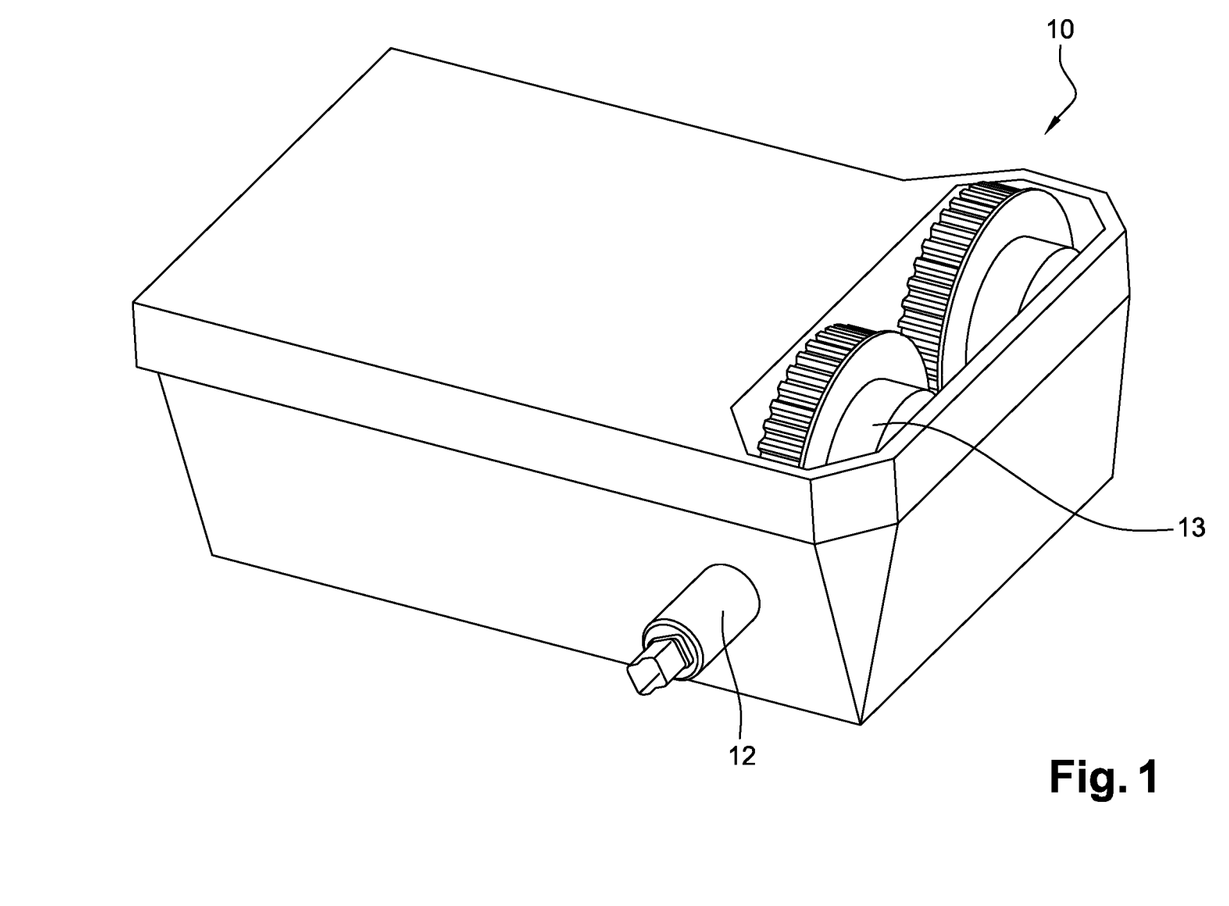
FIG. 1 is a perspective view of an engine with a control device according to the invention.
Figure 2:
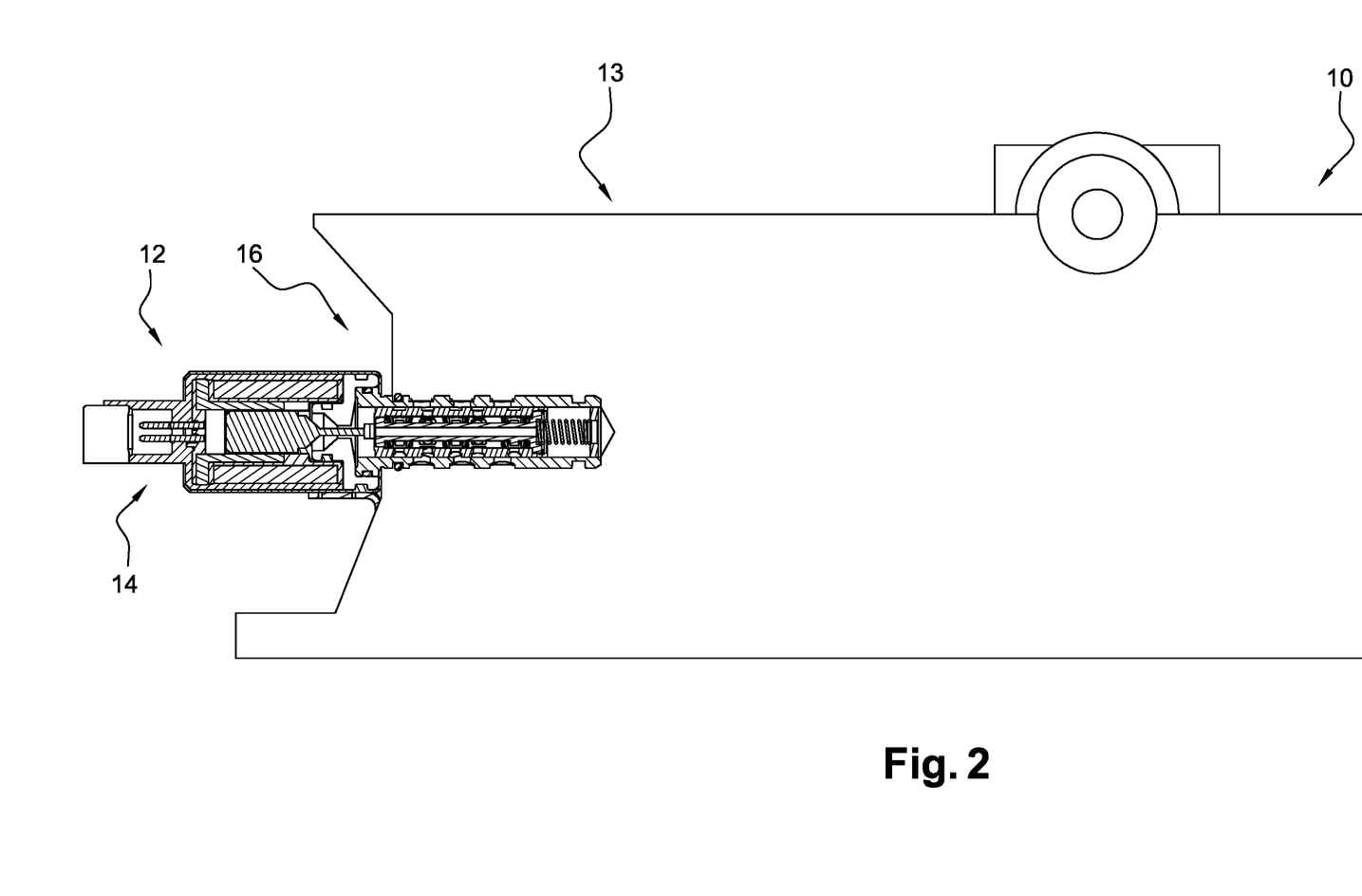
FIG. 2 is a sectional view of an engine with the control device according to the invention.

FIGS. 1 and 2 show an engine 10, a control device 12 and a camshaft phaser 13. The control device 12 is arranged in a bore made in the bottom end of the engine 10.

Figure 3:
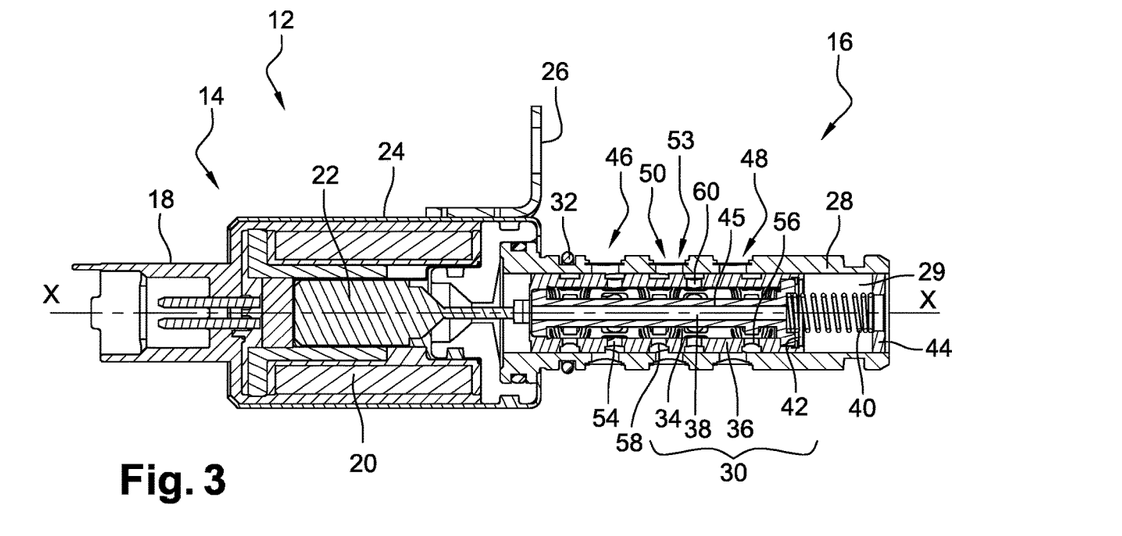
FIG. 3 is a sectional view of the control device according to the invention.
Figure 4:
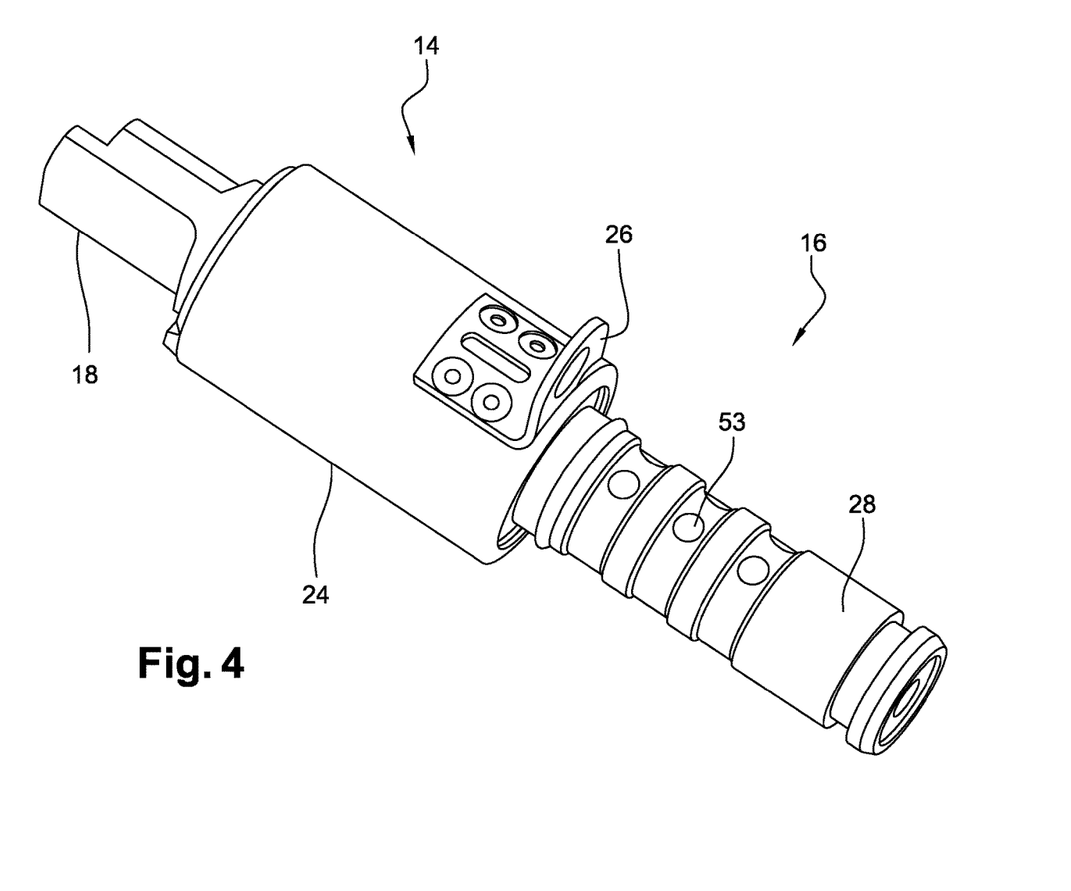
FIG. 4 is a perspective view of the control device according to the invention.

FIGS. 3 and 4 show the control device 12. The control device 12 comprises an electromagnetic actuator 14 and a hydraulic element 16. The electromagnetic actuator 14 manages the hydraulic element 16. The electromagnetic actuator 14 includes a connector 18, a coil 20, a rod 22, a housing 24 and a bracket 26. The connector 18 is arranged at an opposite end to the hydraulic element 16. The hydraulic element 16 includes a body 28, a slide assembly 30, a seal 32, a compression spring 40 and a washer 44. The slide assembly 30 includes a valve assembly 34, a slide body 36, a slide insert 38, and a stop ring 42.

According to FIGS. 3 and 4, the slide assembly 30 is mounted in the body 28 and controls a flow of fluid between the advance and retard chambers of a camshaft phaser (not shown) to rotate the camshaft phaser in the advance or retard directions.

FIGS. 3 and 4 show the body 28 of the hydraulic element. The body 28 extends along a central longitudinal axis X. The body 28 is cylindrical in shape. The body 28 includes a bore 29. The slide assembly 30 defines an internal chamber 45 where the recirculation pressure of the control screw 18 prevails.

The term "at least one opening", used in the description below, defines a number of openings comprising at least one opening.

FIG. 3 shows the hydraulic element 16 comprising the body 28 having three ports 46, 48, 50 arranged radially, which makes three ports. The port 46 is also referred to as the advance port 46. The port 48 is referred to as the retard port 48. The port 50 is referred to as the supply port 50. The three ports 46, 48, 50 are provided with a filter 53.

In FIG. 3, the supply port 50 has at least one opening connected to the pressurized oil circuit of the engine (not shown). The advance port 46 has at least one opening connected to the advance chambers of the rotor of the camshaft phaser 13 (not shown). The retard port 48 has at least one opening connected to the retard chambers of the rotor of the camshaft phaser 13 (not shown).

FIG. 3 shows the slide body 36 comprising openings 54, 56, 58, 60. The openings 54, 56, 58 are arranged radially all around the slide body 36. The opening 54 is also referred to as the advance opening 54. The opening 58 is also referred to as the supply opening 58. The opening 56 is also referred to as the retard opening 56. The opening 60 is also called the recirculation opening 60. The slide body 36 includes at least the advance opening 54, at least the retard opening 56, at least the supply opening 58, and at least the recirculation opening 60. The openings 54, 56, 58 are subjected to the recirculation pressure via the internal chamber 45. The internal chamber 45 is arranged between the slide insert 38 and the slide body 36.

According to FIG. 3, the slide assembly 30 is arranged inside a bore made in the body 28 of the hydraulic element 16. The slide assembly 30 extends along the longitudinal axis X. The oil supply openings 58 communicate with the supply port 50 regardless of the position of the slide assembly 30 on the longitudinal axis X. The recirculation openings 60 communicate with the advance port 46 or the retard port 48 depending on the position of the slide assembly 30 on the longitudinal axis X. The advance openings 54 may or may not communicate with the advance port 46 depending on the position of the slide assembly 30 on the longitudinal axis X. The retard openings 48 may or may not communicate with the retard port 48 depending on the position of the slide assembly 30 on the longitudinal axis X.

According to FIG. 3, the recirculation 60 and supply 58 openings of the slide body are shown. The recirculation 60 and supply 58 openings are elongate in a circumferential direction perpendicular to the longitudinal axis X. In this way, the recirculation 60 and supply 58 openings of the slide body each have an oblong projected section. This oblong cross section allows a greater flow surface area than a circular opening for the same width along the axis X and therefore a greater flow of fluid through the advance 46, retard 48 and supply 50 ports.

According to FIG. 3, the recirculation openings 60 and the oil supply openings 58 are positioned facing the vanes 62 of the valve assembly 34. The valve assembly 34 is arranged in a bore of the slide body 36 such that an external surface of the valve assembly 34 is in contact with the inner surface of the slide body 36.

Figure 5:
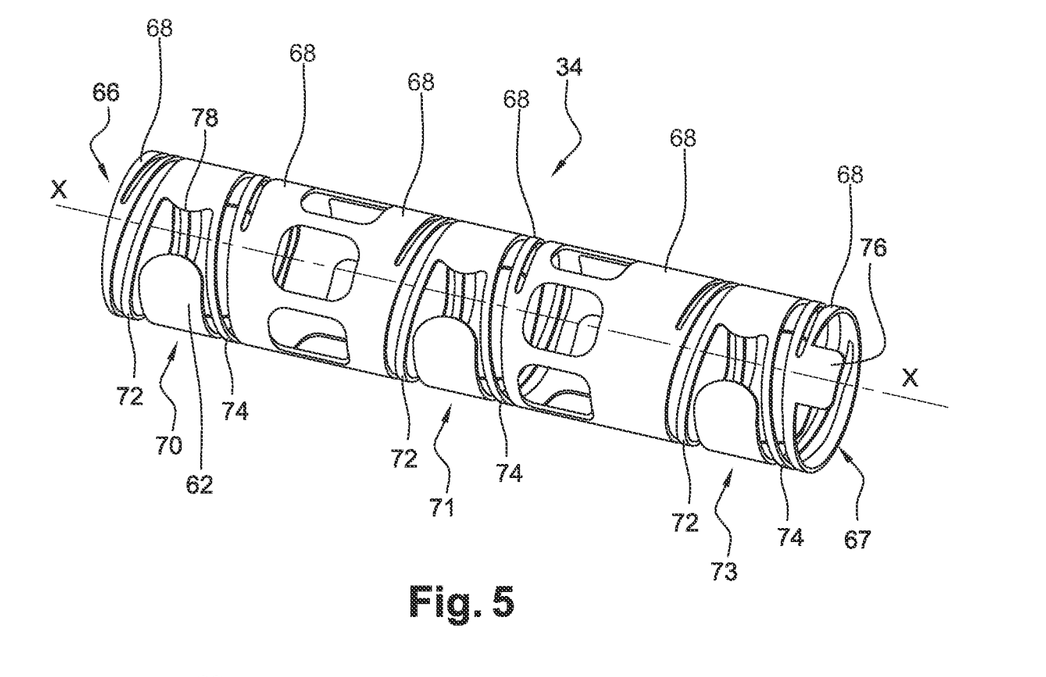
FIG. 5 is a perspective view of a valve assembly according to a first embodiment of the invention.

A first embodiment is described according to FIG. 5. The valve assembly 34 is tubular, i.e. it has a cylindrical shape and is open at both ends 66. Oil can flow through the internal volume of the valve assembly 34, with the oil flowing in the direction of the central longitudinal axis X. The thickness of the tube of the valve assembly 34 is very small compared to its diameter, i.e. of the order of 0.1% to 10%. The valve assembly 34 includes at least three rigid rings 68 and at least a first valve 70, a second valve 71 and a third valve 73. Each valve 70, 71, 73 comprises at least one vane 62 connected to two flexible arms 72, 74 and each valve 70, 71, 73 is connected to two consecutive rigid rings 68. The valve assembly 34 includes at least one angular indexing element 76 formed by an internal or external notch. As shown in FIGS. 2, 3 and 4, the angular indexing element 76 does not allow rotation of the valve assembly 34 inside the body 28 of the hydraulic element 16. The rigid rings 68 may have one or more differently shaped openings to allow the circulation of oil within the valve assembly 34. The vane 62 is elongate in the tangential direction of the tubular valve assembly 34. The shape of the vane 62 defines an oblong shape complementary to the oblong section of the recirculation opening 58 and the supply opening 60 of the slide body. Furthermore, the vane 62 has a surface area which is larger than the surface area of the recirculation opening 60 and the supply opening 58 of the slide body. Covering the two surfaces provides the oil seal necessary for one-way valve operation. The valve assembly 34 comprises a plurality of valves 70 arranged in a circumferential direction perpendicular to the longitudinal axis X. In other alternatives, the valve assembly 34 may include both valves 70, 71, 73 arranged circumferentially and valves 70, 71, 73 arranged linearly along the longitudinal axis X. In the circumferential direction, each pair of flexible arms 72, 74 extends towards the rear of the vane 62 with sufficient space for the next vane in the circumferential direction to be arranged between the pairs of flexible arms 72, 74. The arrangement of the vanes 62 in the same circumferential direction makes it possible to increase the permeability/size ratio of the valve assembly 34.

In the embodiment described above, the vanes 62 and the arms 72, 74 are rigidly secured to one another. The valve assembly 34 may be formed for example by cutting, for example with a laser, a cylindrical metal tube, such as for example steel. Other variants of the embodiment of the valve assembly 34 described above are possible such as starting with a metal sheet then cutting by stamping or by laser or by chemical attack and then rolling the metal sheet and finally welding the rolled metal sheet According to FIG. 5, each valve 70, 71, 73 is defined by the pair of spring arms 72, 74. The arms 72, 74 are also referred to as the first arm 72 and the second arm 74. According to FIG. 5, the spring arms 72, 74 diverge in the direction away from the vane 62 of the valve 70. The first spring arm 72 extends on the left in FIG. 5 towards a first end 66 while the second spring arm 74 extends on the right towards an open second end 67 of the valve assembly 34.

The spring arms 72, 74 are thin in terms of width. Due to the slenderness of the arms, an opening 78 of the vane is defined between the spring arms 72, 74 of the valve 70, 71, 73.

Figure 6:
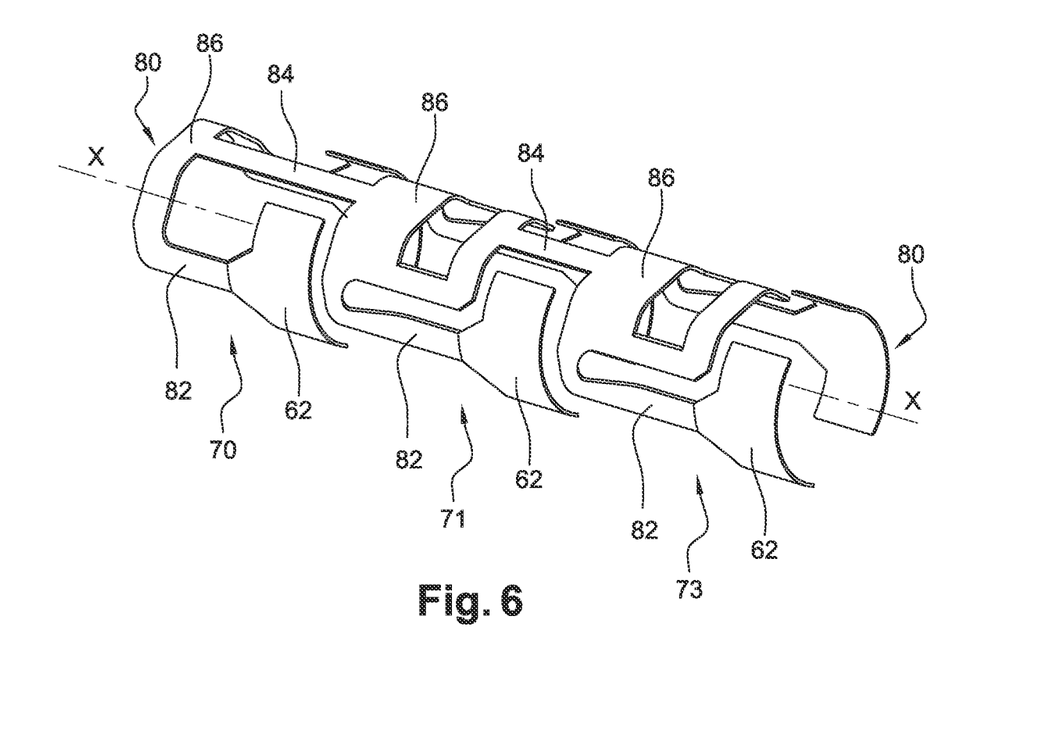
FIG. 6 is a perspective view of the valve assembly according to a second embodiment of the invention.

In a second embodiment, the control valve assembly 34 depicted in FIG. 6 is tubular, i.e. has a cylindrical shape and is open at both ends 80. The shape of the control valve assembly 34 is referred to as an origami shape. The valve assembly 34 includes at least three valves 70. Each valve 70 comprises at least one vane 62 connected to a flexible arm 82 and a rigid element 86. The valve assembly 34 further includes a longitudinal bar 84 extending along the central longitudinal axis X. The longitudinal bar 84 connects two contiguous valves 70, 71, 73. Two contiguous valves 70 are interconnected by a longitudinal bar 84 extending along the axis X. The arm 82 is arranged longitudinally along the axis X. The longitudinal bar 84 is arranged between the two contiguous rigid elements 86. The longitudinal bar 84 serves as an index for the valve assembly 34. The vane 62 is elongate in the tangential direction of the tubular valve assembly 34. The shape of the vane 62 defines a rectangular shape complementary to the oblong section of the recirculation opening 60 and the supply opening 58 of the slide body 36. Moreover, the vane 62 has a surface area which is larger than the surface area of the recirculation opening 60 and the supply opening 58 of the slide body.

According to FIG. 6, the spring arm 82 moves at an angle to the longitudinal axis X while remaining in a plane perpendicular to the axis X. The spring arm 82 moves closer to the central longitudinal axis X.

Figure 7:
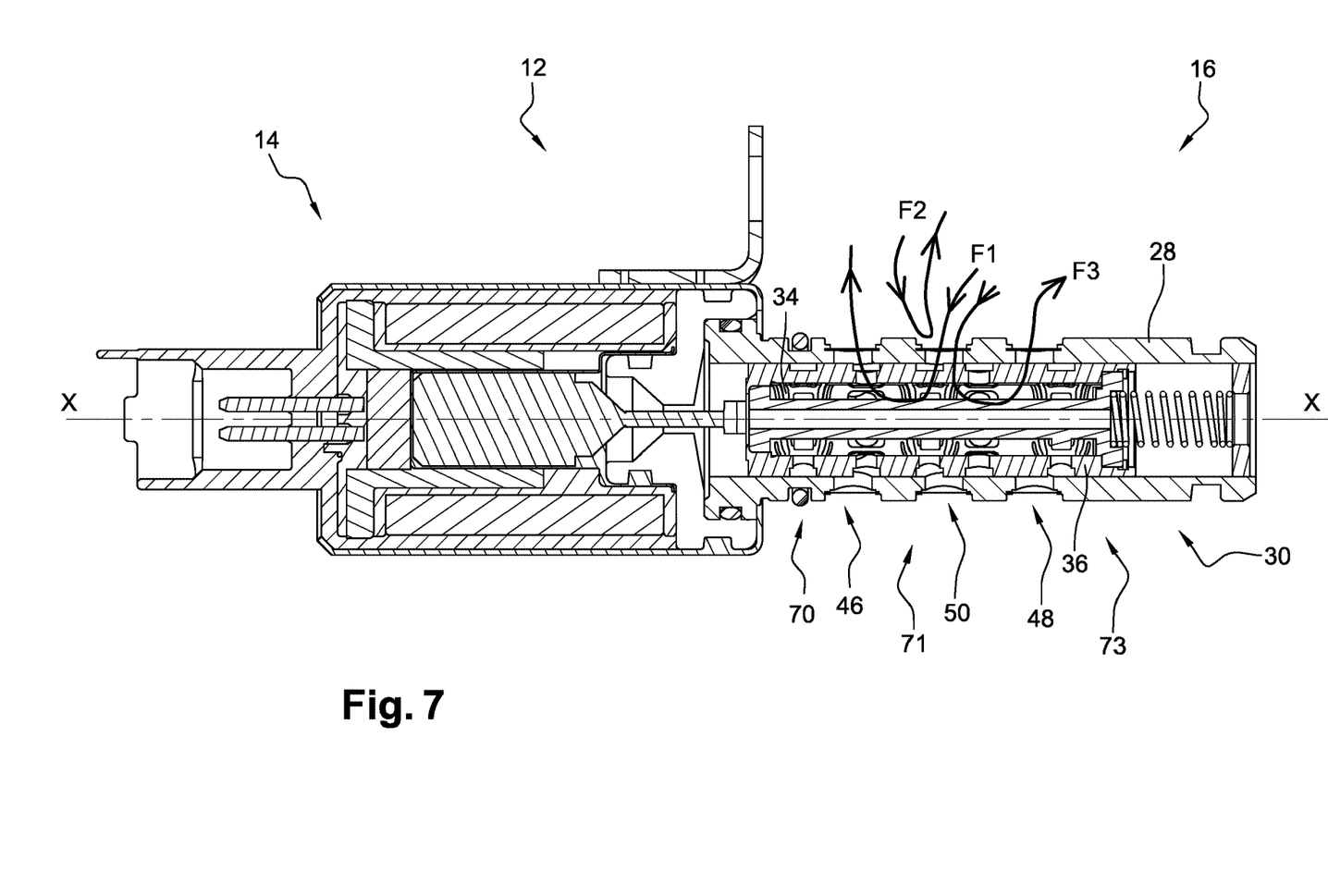
FIG. 7 is a sectional view of the control device with the oil flows according to the invention.

The operation of the control device 12 for controlling the camshaft phaser 13, for locking or releasing a rotor of a camshaft phaser 13, will be described briefly. The electromagnetic actuator 14 is connected to the slide assembly 30 of the hydraulic element 16, which can move along the longitudinal axis X between:

a first position in which the first valve 70 opens or closes a first fluid communication F1 between an advance chamber of the camshaft phaser 13 and an advance port 46 of the slide body 36, a second position in which the second valve 71 and the slide body (36) open or close a second fluid communication (F2) between an oil circuit coming from the engine (10) and a supply port (50) of the slide body (36), and a third position in which the third valve 73 opens or closes a third fluid communication F3 between a retard chamber of the camshaft phaser 13 and a retard port 48 of the slide body 36.

The operation of the valve assembly 34 of the two embodiments will be described briefly. When the pressure exerted on the outside of the vane 62 is greater than the pressure exerted on the inside of the vane 62, the force exerted on the surface tends to deform the flexible arms 72, 74, 82. The arms 72, 74, 82 flex the vane 62, the vane 62 moves towards the central longitudinal axis X which frees the recirculation opening 60 and the supply opening 58 of the slide body 36. The maximum deformation of the arms 72, 74, 82 is limited by radial stops in the slide insert 38.

The tubular valve assembly 34 described above could be incorporated into any other system of a vehicle requiring this type of valve to selectively block an opening as described.

Those skilled in the art will appreciate that the invention may be modified according to numerous variants without departing from the scope of the appended claims.

The method for producing and assembling the invention described above for the two embodiments will be described below:

The method for assembling the control device 12 includes the following steps:
100/ inserting the control valve assembly 34 into the slide body 36,
110/ inserting the slide insert 38 into the assembly obtained in the previous step 100,
120/ inserting the corrugated stop ring 42 into the assembly obtained in the previous step 110,
130/ inserting the compression spring 40 into the body 28,
140/ inserting the slide assembly 30 into the body 28,
150/ crimping the hydraulic element 16 with the electromagnetic actuator 14.

The assembled control device 12 is then placed on the engine 10 and then a screw is screwed through the fixing bracket 26 and tightened for axial and rotational immobilization.

LIST OF REFERENCE SIGNS USED 10 engine
12 control device
13 camshaft phaser
14 electromagnetic actuator 16 hydraulic element
18 connector
20 coil
22 rod
24 housing
26 fixing bracket
28 body
29 bore
30 slide assembly
32 seal
34 control valve assembly
36 slide body
38 slide insert
40 compression spring
42 stop ring
44 washer
45 internal chamber
46 advance port
48 retard port
50 supply port
52 drainage port
53 filter
54 advance opening
56 retard opening
58 supply opening
60 recirculation opening
62 vane
66 first end
67 second end
68 rigid ring
70 valve
72 arm
74 arm
76 indexing element
78 opening
80 end
82 arm
84 longitudinal bar
86 rigid element

The invention claimed is:

1. A control device for locking or releasing a rotor of a camshaft phaser of an internal combustion engine, the control device comprising:
a hydraulic element comprising a body, a slide assembly having a slide body, a seal, and a valve assembly comprising a first valve, a second valve and a third valve; and
an electromagnetic actuator connected to the slide assembly of the hydraulic element which moves along a longitudinal axis between:
a first position, in which the first valve opens or closes a first fluid communication between an advance port of the slide body and an advance chamber of the camshaft phaser;
a second position in which the second valve and the slide body open or close a second fluid communication between an oil circuit coming from the internal combustion engine and a supply port of the slide body; and
a third position in which the third valve and the slide body open or close a third fluid communication between a retard port of the slide body and a retard chamber of the camshaft phaser;
wherein said first valve, said second valve, and said third valve are integrated in a flexible one-piece part such that said first valve, said second valve, and said third each have at least one vane connected to two flexible arms and such that said first valve, said second valve, and said third valve are each connected to two contiguous rigid rings.

2. A method for producing the control device as claimed in claim 1, comprising the following steps:
inserting the valve assembly into the slide body;
inserting a slide insert into an assembly obtained in the previous step;
inserting a corrugated stop ring into an assembly obtained in the previous step;
inserting a compression spring into the body of the hydraulic element;
inserting the slide assembly into the body of the hydraulic element;
crimping the hydraulic element with the electromagnetic actuator.

3. A control device for locking or releasing a rotor of a camshaft phaser of an internal combustion engine, the control device comprising:
a hydraulic element comprising a body, a slide assembly having a slide body, a seal, and a valve assembly comprising a first valve, a second valve and a third valve; and
an electromagnetic actuator connected to the slide assembly of the hydraulic element which moves along a longitudinal axis between:
a first position, in which the first valve opens or closes a first fluid communication between an advance port of the slide body and an advance chamber of the camshaft phaser;
a second position in which the second valve and the slide body open or close a second fluid communication between an oil circuit coming from the internal combustion engine and a supply port of the slide body; and
a third position in which the third valve and the slide body open or close a third fluid communication between a retard port of the slide body and a retard chamber of the camshaft phaser;
wherein said valve assembly comprises a longitudinal bar integrated in a flexible one-piece part with each of said first valve, said second valve, and said third valve such that said first valve, said second valve, and said third each have at least one vane connected to a flexible arm extending along the longitudinal axis and such that the longitudinal bar connects each of said first valve, said second valve, and said third valve to said longitudinal bar.

* * * * *